United States Patent [19]
Govoni et al.

[11] Patent Number: 5,231,119
[45] Date of Patent: Jul. 27, 1993

[54] CRYSTALLINE OLEFIN POLYMERS AND COPOLYMERS IN THE FORM OF SPHERICAL PARTICLES AT HIGH POROSITY

[75] Inventors: Gabriele Govoni; Antonio Ciarrocchi; Mario Sacchetti, all of Ferrara, Italy

[73] Assignee: Himont Incorporated, Wilmington, Del.

[21] Appl. No.: 718,680

[22] Filed: Jun. 21, 1991

Related U.S. Application Data

[63] Continuation-in-part of Ser. No. 515,300, Apr. 27, 1990, abandoned, and Ser. No. 515,390, Apr. 27, 1990, abandoned.

[51] Int. Cl.⁵ ............ C08F 2/00; C08F 4/42; C08J 9/28
[52] U.S. Cl. ............ 523/221; 521/56; 521/143; 521/144; 521/134; 526/124; 526/125; 526/347.2; 526/351; 526/352
[58] Field of Search ............ 523/221; 526/347.2, 526/352, 351, 124; 521/143, 144

[56] References Cited

U.S. PATENT DOCUMENTS

| | | | |
|---|---|---|---|
| 3,450,682 | 6/1969 | Sasaki et al. | 526/347.2 |
| 3,953,414 | 4/1976 | Galli et al. | 526/352 |
| 4,293,673 | 10/1981 | Hamer et al. | 526/352 |
| 4,380,507 | 4/1983 | Noristi et al. | 526/352 |
| 4,983,693 | 1/1991 | Haag et al. | 526/124 |

FOREIGN PATENT DOCUMENTS 290149 9/1988 European Pat. Off.

Primary Examiner—Paul R. Michl
Assistant Examiner—Olga Asinovsky

[57] ABSTRACT

Crystalline olefin polymers and copolymers in the form of spherical particles having porosity (expressed in percentage of voids) higher than 15%, with more than 90% of the pores having a pore diameter greater than one micron. These polymeric particulate materials find many applications, including, e.g., the preparation of masterbatches containing significant quantities of additives and/or pigments.

5 Claims, No Drawings

CRYSTALLINE OLEFIN POLYMERS AND COPOLYMERS IN THE FORM OF SPHERICAL PARTICLES AT HIGH POROSITY

RELATED APPLICATIONS

This application is a continuation-in-part of our application Ser. No. 07/515,300 filed Apr. 27, 1990, abandoned and of our application Ser. No. 07/515,390 entitled "COMPONENTS AND CATALYSTS FOR THE POLYMERIZATION OF OLEFINS" filed Apr. 27, 1990, abandoned, the contents of each being incorporated hereby by reference.

FIELD OF THE INVENTION

This invention relates to crystalline olefin polymers and copolymers in the form of spherical particles with an average diameter between 50 and 7000 microns and porosity and surface area characteristics which make them suitable for, e.g., the preparation of masterbatches containing significant quantities of pigment and/or additives.

BACKGROUND OF THE INVENTION

It is known that catalyst components for the polymerization of olefins comprising a titanium compound supported on a magnesium halide in active form can be obtained in spherical particle form suitable for the development of polymers with optimum morphological characteristics. Components of this type are described in U.S. Pat. Nos. 3,953,414 and 4,399,054. Specifically, the polymers obtained with the catalysts of U.S. Pat. No. 4,399,054 are in spherical particle form having high flowability and high bulk density.

The porosity (around 10% expressed in percentage of voids) and the surface area, however, are not sufficiently high to allow their use, particularly in the field of masterbatch preparation when said masterbatch contain a significant quantity of pigments and/or additives.

SUMMARY OF THE INVENTION

Now it has been found that it is possible to obtain crystalline olefin homopolymers and copolymers in spherical particle form having various advantages by polymerization of olefins of the formula $CH_2=CHR$ wherein R is hydrogen, an alkyl radical with 2-6 carbon atoms or is aryl such as phenyl or substituted phenyl. The foregoing olefin may be homopolymerized or may be copolymerized with another different olefin of the foregoing formula, or may be copolymerized with propylene, wherein the amount of propylene in the resulting copolymer is less than 30% by weight. The crystalline olefin polymer or copolymer is in spherical particle form with an average diameter between 50 and 5000 microns, a porosity expressed in percentage of voids which is greater than 15% and preferably is between 15% and 40%, and wherein more than 40% of the pores have a diameter greater than one micron.

The spherical form particles exhibit a lowered degree of crystallinity relative to a polymer of equivalent crystallizability which has undergone melt pelletization. Reduced crystallinity coupled with the highly porous nature of the sphere provides particular benefits when the material is used as a substrate for subsequent reactions.

Typical spherical polymeric materials show the following properties:

percent porosity = 15–35%;
particle size distribution = 100% of the spherical particles have a diameter between 1000 and 3000 microns; preferably 40–50% of the particles have a diameter between 1000 and 2000 microns, and 35–45% between 2000 and 3000 microns;
more than 90% of the pores have a diameter greater than one micron.

The percent porosity is determined by absorption of mercury according to the method described hereinafter.

DETAILED DESCRIPTION

The catalysts used in the preparation of the foregoing spherical polymers and copolymers are obtained from catalyst components having particular morphological properties, including a titanium halide or titanium haloalcoholate, supported on magnesium chloride.

The spherical catalyst components are obtained from adducts of magnesium chloride with alcohols generally containing 3 moles of alcohol per mole of $MgCl_2$, prepared by emulsifying, in the molten state, the adduct in an inert hydrocarbon liquid immiscible with the melted adduct, then cooling the emulsion in a very short time in order to effect solidification of the adduct in the form of spherical particles.

The particles are then subjected to partial dealcoholization using a heating cycle at a temperature increasing from 50° to 130° C. until the alcohol content is reduced from 3 to a value as low as 0.1, preferably from 0.1 to 1.5 moles per mole of $MgCl_2$.

The adducts thus obtained are suspended cold in $TiCl_4$, at a concentration of 40–50 g/l, and then brought to a temperature of 80°–135° C. where they are maintained for 1–2 hours.

An electron-donor compound can also be added to the $TiCl_4$ selected, preferably, from the alkyl, cycloaklyl or aryl esters of phthalic acid, such as diisobutyl, di-n-butyl and di-n-octyl phthalate.

The excess $TiCl_4$ is then removed hot through filtration or sedimentation, and the treatment with $TiCl_4$ is repeated one or more times. The solid is then washed with heptane or hexane and then dried.

The catalyst components obtained in this manner have the following properties:
surface area = less than 100 m$^2$/g, preferably less than 80 m$^2$/g;
porosity (nitrogen) = 0.20–0.50 ml/g;
pore volume distribution such that more than 50% of the pores have a radius greater than 100 Å.

The catalyst is obtained by mixing the solid catalyst component with an Al-trialkyl compound, preferably Al-triethyl or Al-triisobutyl.

The Al/Ti ratio is generally between 10 and 800.

The polymerization of ethylene and/or the other olefins is carried out according to known techniques operating in liquid phase or in the gas phase. The polymerization temperature is preferably between 70° and 90° C. The catalysts can be precontacted with small quantities of olefin (prepolymerization), maintaining the catalyst in suspension in a hydrocarbon solvent, polymerizing at a temperature between room temperature and 60° C., and producing quantities of polymer greater than 0.5 times the weight of the catalyst component.

The prepolymerization can also be carried out in liquid propylene, in which case quantities of polymer up to 1000 times the weight of the catalyst can be produced.

The resulting spherical polymer particles may be used in the preparation of masterbatches according to known techniques. One such technique involves permitting the polymer to absorb a solution or emulsion of the additive filler or pigment in a solvent, and then evaporating the solvent. The quantity of additive which remains incorporated depends on the concentration of the solution or emulsion itself. Another technique involves effecting the absorption of the additive or mixtures of additives in the melted form.

If the substances which constitute the additive, fillers, or pigments are solid and have a high melting point, said substances can be added in powder form to the polymer particles using paraffin oils or liquid wetting and surface-active agents such as liquid ethoxylated amines in order to obtain a good adhesion. It is preferable to use powders with a particle size lower than 10 μm.

In any case, masterbatches can be prepared very simply by feeding the polymer particles and at least one additive, pigment, filler or combinations thereof, in normal mixers for powders, and mixing for the desired residence time.

The preferred mixers are those having a velocity from about 150 rpm (for mixers with an internal volume of about 130 liters), up to 500 rpm (for mixers with a smaller internal volume of up to about 10 liters) which are thermoregulated. The use of thermoregulated mixers is particularly recommended.

The mixers are equipped with spray-feeders for the liquids, and hopper-feeders for the solids. The substances which can be fed in the molten state are normally melted in autoclaves under nitrogen.

When operating according to the above-mentioned methods one can obtain concentrations of additives, pigments, or fillers, or combinations thereof, up to 20%–30% by weight with respect to the total weight of the concentrate. Obviously these maximum values are not absolute, since when operating, for instance, with fillers having a high specific gravity, one can reach concentrations around 50% by weight. The minimum concentration value is a function of the additives, fillers, or pigments which are used, and of the concentration which one wants to obtain in the final products. In some cases it is possible to go down to a concentration of 5% by weight with respect to the total weight of the concentrate.

The additives pigments and/or fillers that can be used are those normally added to polymers in order to impart desired properties. They include stabilizers, fillers, nucleating agents, slip agents, lubricant and antistatic agents, flame retardants, plasticizers, and blowing agents.

A large number of different grades of olefin polymers can be obtained in the form of spherical particles according to the invention. The polymers include high density polyethylenes (HDPE: density greater than 0.940), comprising homopolymers of ethylene and copolymers of ethylene with alpha-olefins having from 3 to 12 carbon atoms; linear low-density polyethylenes (LLDPE: density less than 0.940); very low and ultra low density linear polyethylenes (VLLDPE and ULLDPE; density less than 0.920 and as low as 0.890), said LLDPE, VLLDPE and ULLDPE consisting of copolymers of ethylene and one or more alpha-olefins having from 3 to 12 carbon atoms, with a content of units derived from ethylene of over 80% by weight; crystalline polymers and copolymers of butene-1, 4-methyl-pentene-1, and styrene.

The data reported in the following examples are determined as indicated below:

| Property | Method |
| --- | --- |
| MIL flowability index | ASTM-D 1238 |
| Surface area | B.E.T. (apparatus used SORPTOMATIC 1800-C. Erba) |
| Porosity (nitrogen) | B.E.T. (see above) |
| Bulk density | DIN-53194 |
| Flowability | The time needed for 100 g of polymer to flow through a funnel with an outlet hole of 1.27 cm in diameter and the walls of which are inclined at 20° C. to the vertical |
| Morphology | ASTM-D 1921-63 |

The porosity expressed as percentage of voids is determined through absorption of mercury under pressure. The volume of mercury absorbed corresponds to the volume of the pores. In order to determine this, a dilatometer is used with calibrated probe (3 mm diam.) C D3 (C. Erba) connected to a mercury reservoir and a high vacuum rotating pump ($1 \times 10^{-2}$ mba).

A weighted quantity of the sample (about 0.5 g) is introduced into the dilatometer. The apparatus is then brought to a high vacuum (<0.1 mm Hg) and held for 10 minutes. The dilatometer is then connected to the mercury reservoir and the mercury is allowed to flow in slowly until it reaches the level marked on the probe at a height of 10 cm.

The valve that connects the dilatometer to the vacuum pump is closed and the apparatus is pressurized with nitrogen (2.5 kg/cm$^2$) The pressure causes the mercury to penetrate the pores and the level lowers in accordance with the porosity of the material. After the measure on the probe where the new mercury level has stabilized is determined, the volume of the pores is calculated as follows: $V = R^2 \pi \cdot \Delta H$ where R is the radius of the probe in cm, and $\Delta H$ is the difference in level in cm between the initial and final levels of the mercury column.

By weighing the dilatometer, dilatometer+mercury and dilatometer+mercury+sample, a value of apparent sample volume prior to pore penetration can be calculated. The volume of the sample is given by:

$$V_1 = \frac{P_1 - (P_2 - P)}{D}$$

wherein
P is the weight of the sample in g;
Pl is the weight in g of the dilatometer+mercury;
P2 is the weight in g of the dilatometer+mercury+sample;
D is the density of the mercury (at 25° C. = 13.546 g/cc)

The porosity percentage is given by:

$$X = \frac{100 \times V}{V_1}$$

The following examples further illustrate the invention.

EXAMPLE 1

A MgCl$_2$.3C$_2$H$_5$OH adduct in spherical particle form, which particles have a diameter from 30 to 150 microns, is prepared following the method described in Example 2 of U.S. Pat. No. 4,399,054, the disclosures of said method being incorporated herein by reference, operating at 5,000 rpm instead of 10,000 rpm. The resultant adduct is then dealcoholated by heating with temperature increasing from 50° to 100° C. under a nitrogen stream until the alcohol content reaches 1.2 mole for each mole $MgCl_2$. The adduct thus obtained has a surface area of 11.5 $m^2/g$.

31.2 g of said adduct are added in a reaction vessel under agitation at 0° C. to 625 ml of $TiCl_4$. Then the foregoing mixture is heated to 100° C. for one hour. When the temperature reaches 40° C., diisobutyl phthalate s added in a molar ratio Mg/diisobutyl phthalate = 8. The contents of the vessel are then heated to 100° C. for 1 hour, left to settle and subsequently the liquid is syphoned off hot. 500 ml of $TiCl_4$ are added, the solid and the contents of the vessel heated to 120° C. for one hour, the reaction mixture is then left to settle and the liquid is syphoned off hot. The resulting solid is washed 6 times with 200 ml aliquots of anhydrous hexane at 60° C. and then 3 times at room temperature. The solid catalyst component, after drying under vacuum, has the following characteristics:

Ti content = 2.5% by weight;
porosity (nitrogen) = 0.261 cc/g;
surface area = 66.4 $m^2/g$.

Using 0.02 g of this solid, an ethylene polymerization is conducted in a 2.5 l stainless steel autoclave equipped with an agitator and a thermostatic system, which had been degassed with nitrogen at 70° C. for one hour.

At 45° C. there is introduced in $H_2$ stream 900 ml of a solution containing 0.5 g/l of Al-triisobutyl in anhydrous hexane and immediately afterwards, the catalyst component is suspended in 100 ml of the above-mentioned solution.

The temperature is rapidly brought to 75° C. and $H_2$ is fed until the pressure reaches 3 atm, then ethylene is fed up to 10.5 atm. These conditions are maintained for 3 hours, replenishing continuously the ethylene depleted. At the end of the polymerization reaction, the autoclave is rapidly vented and cooled at room temperature.

The polymeric suspension is filtered and the solid residue dried in nitrogen at 60° C. for 8 hours.

400 g of polyethylene are obtained with the following characteristics:

MIE = 0.25 g/10';
MIF = 7.8 g/10';
MIF/MIE = 31.2;
morphology = 100% spherical particles with diameter between 1000 and 5000 μm;
flowability = 12 sec.;
bulk density = 0.38 g/cc;
void percentage = 30.

EXAMPLE 2

By partially dealcoholating (as per Example 1) a $MgCl_2.3EtOH$ spherical adduct obtained according to the method indicated in the preceding example, an adduct is obtained with $ETOH/MgCl_2$ molar ratio of 0.15 with the following characteristics:

porosity (mercury) = 1.613 cc/g;
surface area = 22.2 $m^2/g$.

By treatment of the foregoing adduct with $TiCl_4$ at a temperature of 135° C. (concentration = 50 g/l) for one hour three successive times, a spherical catalyst component is obtained which, after elimination of excess $TiCl_4$ by washing with n-hexane and subsequent drying, exhibits the following characteristics:

Ti = 2% by wt.;
porosity (nitrogen) = 0.435 cc/g;
surface area = 44.0 $m^2/g$.

Using 0.012 of this component in the polymerization of ethylene as described in Example 1, 380 g of polyethylene are obtained with the following characteristics:

MIE = 0.205 g/10';
MIF = 16.42 g/10';
MIF/MIE = 80.1;
flowability = 12 sec.;
bulk density = 0.40 g/cc;
void percentage = 23.5%;
morphology = 100% spherical particles with diameter between 1000–5000μ.

EXAMPLE 3

20 kg of polyethylene in spherical particle form obtained with a continuous ethylene polymerization test using a catalyst obtained from solid catalyst component and co-catalyst components of Example 1 are introduced into a Loediga FM 130 P mixer lined with steam at 100° C. and mixed for 5 minutes at a blade speed of 150 rpm until the temperature of the polymer reaches 70° C. 5 kg of Atmer 163 product (Atlas) are then sprayed into the mixer at 100° C. The agitation is continued for 15 minutes and then the product is discharged. The polymer thus obtained is in the form of spherical particles with 100% of the particles having a diameter from 1000 to 5000 microns which particles contain 19.8% by weight of Atmer product and have a flowability of 13 sec.

Variations can of course be made without departing from the spirit of our invention as set out in the following claims.

We claim:

1. Crystalline homopolymers of an olefin of the formula $CH_2=CHR$, wherein R is hydrogen, an alkyl radical having 2 to 6 carbon atoms, or aryl, and crystalline copolymers of said olefin with another different olefin of said formula or with propylene, wherein the amount of propylene in said copolymers is less than 30% by weight, said polymers and copolymers being in the form of spherical particles with an average diameter between 50 and 5000 microns and a porosity expressed in void percentage greater than 15%.

2. The spherical particles of claim 1, wherein more than 40% of the pores have a diameter greater than one micron.

3. The spherical particles of claim 1, and wherein more than 90% of the pores have a diameter greater than one micron.

4. The spherical particles of claim 1, wherein the void percentage is between 20 and 40%.

5. The spherical particles of claim 1 containing additives, fillers and/or pigments in an amount greater than 10% by weight.

* * * * *